United States Patent
Song et al.

(10) Patent No.: US 11,169,514 B2
(45) Date of Patent: Nov. 9, 2021

(54) UNSUPERVISED ANOMALY DETECTION, DIAGNOSIS, AND CORRECTION IN MULTIVARIATE TIME SERIES DATA

(71) Applicant: NEC Laboratories America, Inc., Princeton, NJ (US)

(72) Inventors: Dongjin Song, Princeton, NJ (US); Yuncong Chen, Plainsboro, NJ (US); Cristian Lumezanu, Princeton Junction, NJ (US); Haifeng Chen, West Windsor, NJ (US); Chuxu Zhang, South Bend, IN (US)

(73) Assignee: NEC CORPORATION

( * ) Notice: Subject to any disclaimer, the term of this patent is extended or adjusted under 35 U.S.C. 154(b) by 222 days.

(21) Appl. No.: 16/549,146

(22) Filed: Aug. 23, 2019

(65) Prior Publication Data
US 2020/0064822 A1 Feb. 27, 2020

Related U.S. Application Data

(60) Provisional application No. 62/796,670, filed on Jan. 25, 2019, provisional application No. 62/723,024, filed on Aug. 27, 2018.

(51) Int. Cl.
*G05B 23/02* (2006.01)
*G06N 3/04* (2006.01)

(52) U.S. Cl.
CPC ..... *G05B 23/0254* (2013.01); *G05B 23/0275* (2013.01); *G06N 3/0454* (2013.01)

(58) Field of Classification Search
CPC .......... G05B 23/0254; G05B 23/0275; G05B 23/024; G06N 3/0454; G06N 3/0445; G06N 3/08
See application file for complete search history.

(56) References Cited

U.S. PATENT DOCUMENTS

| | | | | |
|---|---|---|---|---|
| 10,176,388 | B1* | 1/2019 | Ghafarianzadeh ... | G06N 3/0454 |
| 10,410,113 | B2* | 9/2019 | Clayton ............... | G06N 3/0445 |
| 2012/0155572 | A1* | 6/2012 | Kim ........................ | H03F 3/24 |
| | | | | 375/297 |
| 2017/0169357 | A1* | 6/2017 | Caspi ...................... | G06N 3/08 |

(Continued)

OTHER PUBLICATIONS

Park et al., A Multimodal Anomaly Detector for Robot-Assisted Feeding Using an LSTM-Based Variational Autoencoder (Year: 2018).*
Luo et al., Remembering history with convolutional lstm for anomaly detection, IEEE (Year: 2017).*
Qu et al., A Unsupervised Learning Method of Anomaly Detection Using GRU, IEEE (Year: 2018).*

(Continued)

*Primary Examiner* — Mohammad K Islam
(74) *Attorney, Agent, or Firm* — Joseph Kolodka

(57) ABSTRACT

Methods and systems for anomaly detection and correction include generating original signature matrices that represent a state of a system of multiple time series. The original signature matrices are encoded using convolutional neural networks. Temporal patterns in the encoded signature matrices are modeled using convolutional long-short term memory neural networks for each respective convolutional neural network. The modeled signature matrices using deconvolutional neural networks. An occurrence of an anomaly is determined using a loss function based on a difference between the decoded signature matrices and the original signature matrices. A corrective action is performed responsive to the determination of the occurrence of the anomaly.

16 Claims, 5 Drawing Sheets

(56) References Cited

U.S. PATENT DOCUMENTS

| | | | | |
|---|---|---|---|---|
| 2017/0244507 | A1* | 8/2017 | Hannan | H04W 72/0413 |
| 2018/0025257 | A1* | 1/2018 | Oord | G06K 9/66 |
| | | | | 375/240.14 |
| 2018/0053085 | A1* | 2/2018 | Matsumoto | G06N 3/0481 |
| 2018/0204111 | A1* | 7/2018 | Zadeh | G06K 9/3233 |
| 2018/0284758 | A1* | 10/2018 | Celia | G01M 13/045 |
| 2018/0365562 | A1* | 12/2018 | Volkova | G06N 3/0445 |
| 2019/0147125 | A1* | 5/2019 | Yu | G06F 17/16 |
| | | | | 703/10 |
| 2019/0228312 | A1* | 7/2019 | Andoni | G06F 17/18 |
| 2019/0246102 | A1* | 8/2019 | Cho | H04N 19/184 |
| 2019/0273509 | A1* | 9/2019 | Elkind | G06F 21/562 |
| 2019/0312898 | A1* | 10/2019 | Verma | G06N 3/084 |
| 2019/0324068 | A1* | 10/2019 | Natsumeda | G01R 21/133 |
| 2019/0379468 | A1* | 12/2019 | Roessel | H04W 24/10 |
| 2020/0076841 | A1* | 3/2020 | Hajimirsadeghi | G06N 3/0445 |
| 2020/0090043 | A1* | 3/2020 | Mnih | G06N 3/0445 |
| 2020/0213940 | A1* | 7/2020 | Gandhi | H04W 52/0206 |
| 2021/0004541 | A1* | 1/2021 | Saito | G06F 40/20 |
| 2021/0019555 | A1* | 1/2021 | Kalchbrenner | G06K 9/00744 |

OTHER PUBLICATIONS

Lu et al., Early Fault Detection Approach With Deep Architectures, IEEE (Year: 2018).*

James D. Hamilton, "Time Series Analysis", Cambridge University Press, Jan. 1994.

Larry M. Manevitz et al., "One-Class SVMs for Document Classification", Journal of Machine Learning Research 2, Dec. 2001.

Haifeng Chen et al., "Exploiting Local and Global Invariants for the Management of Large Scale Information Systems", 2008 Eighth IEEE International Conference on Data Mining, Pisa, Dec. 2008.

Pankaj Malhotra et al., "LSTM-basedEncoder-DecoderforMulti-sensorAnomalyDetection", ICML Workshop, Jul. 2016.

Yao Qin et al., "A Dual-Stage Attention-Based Recurrent Neural Network for Time Series Prediction" Proceedings of the Twenty-Sixth International Joint Conference on Artificial Intelligence (IJCAI-17), Apr. 2017.

Bo Zong et al., "Deep Autoencoding Gaussian Mixture Model for Unsupervised Anomaly Detection", ICLR 2018 Conference Blind Submission, Feb. 2018.

* cited by examiner

UNSUPERVISED ANOMALY DETECTION, DIAGNOSIS, AND CORRECTION IN MULTIVARIATE TIME SERIES DATA

RELATED APPLICATION INFORMATION

This application claims priority to U.S. Provisional Patent Application No. 62/723,024, filed on Aug. 27, 2018, and to U.S. Provisional Patent Application No. 62/796,670, filed on Jan. 25, 2019, incorporated herein by reference in their entirety.

BACKGROUND

Technical Field

The present invention relates to anomaly detection and diagnosis and, more particularly, to the detection of anomalous behavior and the identification of particular time series information associated with the anomalous behavior.

Description of the Related Art

Complex systems, such as in modern manufacturing industries, power plants, and information services, are difficult to monitor due to the large number of sensors, each generating respective time series information. For example, temperature and pressure sensors may be distributed throughout a power plant. It is challenging to identify anomalous behavior across such complex systems, and it can be even more challenging to identify which particular sensors are the source of an anomalous reading.

SUMMARY

A method for anomaly detection and correction includes generating original signature matrices that represent a state of a system of multiple time series. The original signature matrices are encoded using convolutional neural networks. Temporal patterns in the encoded signature matrices are modeled using convolutional long-short term memory neural networks for each respective convolutional neural network. The modeled signature matrices using deconvolutional neural networks. An occurrence of an anomaly is determined using a loss function based on a difference between the decoded signature matrices and the original signature matrices. A corrective action is performed responsive to the determination of the occurrence of the anomaly.

An anomaly detection and correction system includes a neural network configured to encoding original signature matrices, which represent a state of a system of multiple time series, using convolutional neural network stages, to model temporal patterns in the encoded signature matrices using convolutional long-short term memory neural network stages for each respective convolutional neural network, and to decode the modeled signature matrices using deconvolutional neural network stages. An anomaly detector is configured to determine an occurrence of an anomaly using a loss function based on a difference between the decoded signature matrices and the original signature matrices. A controller is configured to perform a corrective action responsive to the determination of the occurrence of the anomaly.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide automatic detection, diagnosis, and correction of anomalous behavior in a complex system. In particular, the present embodiments construct multi-scale signature matrices to characterize multiple levels of system statuses across different time steps. Different levels of the system statuses are used to indicate the severity of different abnormal incidents. Given the signature matrices, a convolutional encoder can be used to encode spatial patterns and a convolutional long-short term memory (LSTM) network can be used to encode temporal patterns. Using the resulting spatio-temporal feature maps, a deconvolutional encoder can be used to reconstruct signature matrices and residual signature matrices to detect and diagnose the anomalies.

The present embodiments thereby formulate anomaly detection and diagnosis as three underlying, interrelated tasks: anomaly detection, root cause identification, and severity interpretation. The present embodiments address these three tasks jointly using the system signature matrix.

Figure 1:
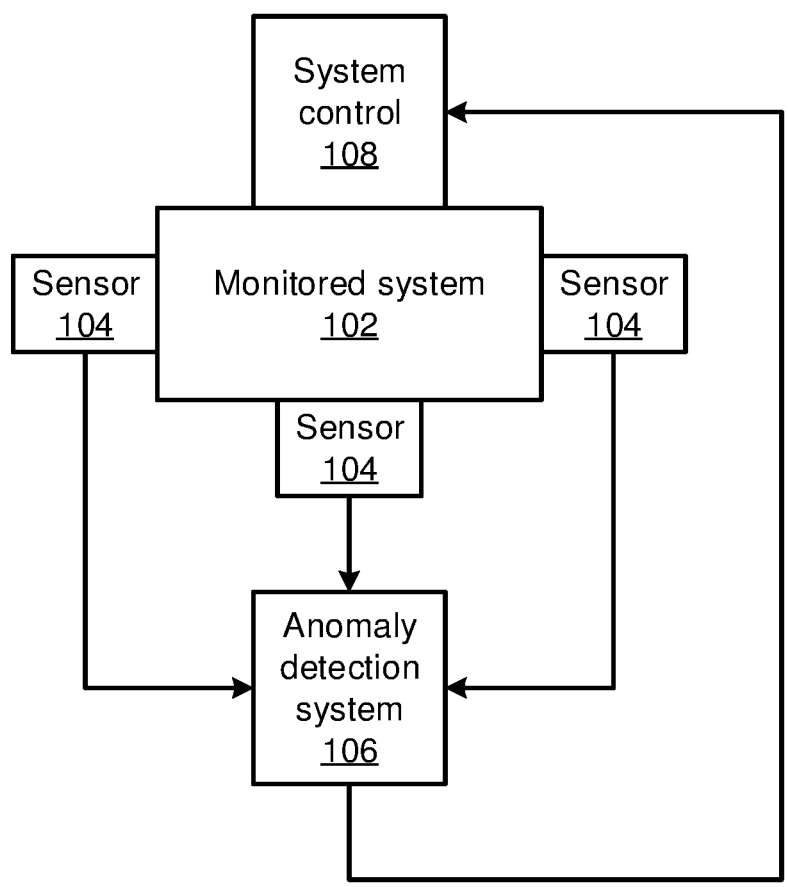
FIG. 1 is a block diagram of a monitored system with anomaly detection and correction in accordance with an embodiment of the present invention.

Referring now to FIG. 1, an anomaly detection system 106 in the context of a monitored system 102. The monitored system 102 can be any appropriate system, including physical systems such as manufacturing lines and physical plant operations, electronic systems such as computers or other computerized devices, and software systems such as operating systems and applications.

One or more sensors 104 record information about the state of the monitored system 102. The sensors 104 can be any appropriate type of sensor including, for example, physical sensors, such as temperature, humidity, vibration, pressure, voltage, current, magnetic field, electrical field, and light sensors, and software sensors, such as logging utilities installed on a computer system to record information regarding the state and behavior of the operating system and applications running on the computer system. The information generated by the sensors 104 can be in any appropriate format and can include sensor log information generated with heterogeneous formats.

The sensors 104 may transmit the logged sensor information to an anomaly detection system 106 by any appropriate communications medium and protocol, including wireless and wired communications. The anomaly detection system 106 can, for example, predict the behavior of the monitored system 102 and compare the actual behavior, measured by the sensors 104, to the predicted behavior. Abnormal behavior can be identified by, for example, detecting whether the actual behavior of the monitored system 102 deviates from the predicted behavior by more than a threshold amount, in which case the anomaly detection system 106 can identify the behavior as being anomalous.

Once anomalous behavior has been detected, the anomaly detection system 106 communicates with a system control unit 108 to alter one or more parameters of the monitored system 102 to correct the anomalous behavior. Exemplary corrective actions include changing a security setting for an application or hardware component, changing an operational parameter of an application or hardware component (for example, an operating speed), halting and/or restarting an application, halting and/or rebooting a hardware component, changing an environmental condition, changing a network interface's status or settings, etc. The anomaly detection system 106 thereby automatically corrects or mitigates the anomalous behavior.

By providing anomaly detection for systems that are new, or for which anomalous behavior is uncommon or has not been previously recorded, the present embodiments provide a substantial improvement in the operation of the monitored system and thus represent a significant improvement in the technical fields of anomaly detection and automated system management. The present embodiments include fewer false alarms and more true detections of abnormal behavior than other types of anomaly detection. In addition, the present embodiments detect all anomalies, including those that have not been encountered before.

Figure 2:
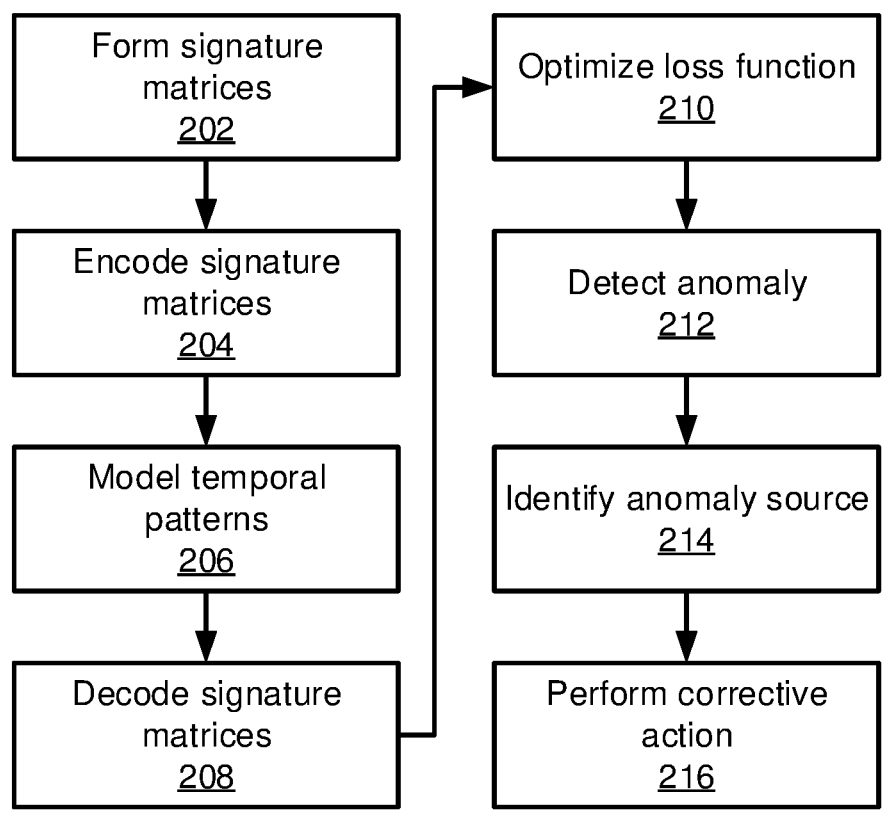
FIG. 2 is a block/flow diagram of a method for anomaly detection and correction in accordance with an embodiment of the present invention.

Referring now to FIG. 2, a method of detecting, diagnosing, and correcting anomalies is shown. Block 202 forms the signature matrices for the system 102. The anomaly detection system 106 uses historical data made up of n time series, each having a length T, with the assumption that there are no anomalies in the historical data. Each time series can be expressed as $X=(x_1, x_2, \ldots x_n)^T \in \mathcal{R}^{n \times T}$. The anomaly detection system 106 detects anomaly events at time steps that occur after T and, based on a detection result, identifies the abnormal time series that are most likely to be the cause(s) of the anomaly and interprets the anomaly severity qualitatively, for example as a measure of duration.

The anomaly detection system 106 constructs an n×n signatures matrix $M^t$, where t indicates a particular time. Given two time series segments $x_i^w = (x_i^{t-w-1}, \ldots x_i^t)$ and $x_j^w = (x_j^{t-w}, x_j^{t-w-1}, \ldots, x_j^t)$, where w defines a duration of a time period, their correlation $m_{ij}^t \in M^t$ is determined as:

$$m_{ij}^t = \frac{\sum_{\delta=0}^{W} x_i^{t-\delta} x_j^{t-\delta}}{\kappa}$$

where κ is a rescale factor and δ is an index from time step t−w to t.

The signature matrix $M^t$ captures both shape similarity and value scale correlation between two time series using the inner product. The signature matrix is furthermore robust to data noise, as individual turbulence has little impact on the whole system. A set of l different signature matrices can be used to characterize system status at different time scales, for example using different respective segment sizes (e.g., w=10, 30, 60).

Block 204 encodes the signature matrices. To model the spatial patterns and to encode them as compact representations, the present can, for example, employ convolutional neural networks (CNNs). $M^t$ is treated as a three-dimensional tensor $\chi^t$ of size k×n×n. χ is used as an input to a number of convolutional layers, where the transformation of layer k is formulated as:

$$\bullet^{t,k} = f(\bullet^{t,k-1} * W^k + b^k)$$

where * denotes a convolutional operation, f(·) is the activation function of the CNN, and $W^k$ and $b^k$ are filter parameters of the $k^{th}$ convolutional layer. In some embodiments, scaled exponential linear units (SELUs) are used in four convolutional layers. In one specific embodiment, the four convolutional layers can have filters sized 3×3×3×32, 3×3×32×64, 2×2×64×128, and 2×2×128×256 and steps sized 1, 2×2, 2×2, and 2×2, respectively. The orders of different time series can be specified to have little influence, as time series has underlying spatial patterns within the capability of the CNNs.

Block 206 models temporal patterns. The system signature matrices of each multivariate time series segment is correlated with previous segments due to the temporal dependency of time series data. The present embodiments use, e.g., convolutional LSTM to model temporal dependencies among consecutive signature matrices. Unlike standard LSTM, convolutional LSTM incorporates spatial patterns of signature matrices into temporal modeling. Specifically, for each time segment with output representation $\chi^{t,k}$ from the $k^{th}$ convolutional layer and previous hidden state tensor $\mathcal{H}^{t-1,k}$, the current hidden state $\mathcal{H}^{t,k}$ is updated by $\mathcal{H}^{t,k} = \text{ConvLSTM}(\chi^{t,k}, \mathcal{H}^{t-1,k})$, where the ConvLSTM cell is formulated as:

$$z^{t,k} = \sigma(W_{\chi Z}^k * \chi^{t,k} + W_{\mathcal{H}Z}^k * \mathcal{H}^{t-1,k} + W_{CZ}^k \circ \mathcal{C}^{t-1,k} + b_Z^k)$$

$$r^{t,k} = \sigma(W_{\chi \mathcal{R}}^k * \chi^{t,k} + W_{\mathcal{H}\mathcal{R}}^k * \mathcal{H}^{t-1,k} + W_{C\mathcal{R}}^k \circ \mathcal{C}^{t-1,k} + b_{\mathcal{R}}^k)$$

$$\mathcal{C}^{t,k} = r^{t,k} \circ \mathcal{C}^{t-1,k} + z^{t,k} \circ \tanh(W_{\mathcal{H}C}^k * \mathcal{H}^{t-1,k} + W_{\mathcal{H}C}^k * \mathcal{H}^{t-1,k} + b_C^k)$$

$$o^{t,k} = \sigma(W_{\chi O}^k * \chi^{t,k} + W_{\mathcal{H}O}^k * \mathcal{H}^{t-1,k} + W_{CO}^k \circ \mathcal{C}^{t,k} + b_O^k)$$

$$\mathcal{H}^{t,k} = o^{t,k} \circ \tanh \mathcal{C}^{t,k}$$

where * is the convolutional operator, ∘ represents a Hadamard product, σ is the sigmoid function, and W are parameters of the convolutional LSTM networks. The inputs, $\chi^{t,k}$, cell outputs $\mathcal{C}^{t,k}$, hidden states $\mathcal{H}^{t-1,k}$, and gates $z^{t,k}$, $r_{t,k}$, and $o^{t,k}$ are expressed as three-dimensional tensors.

The step length h of the convolutional LSTM networks represents the number of previous segments and can be set to, e.g., 5. Multiple stacked convolutional LSTM layers can be used to capture temporal patterns at each convolutional layer. Furthermore, because not all previous steps contribute equally to the representation of the current segment $\mathcal{H}^{t,k}$, temporal attention is used to extract the steps that are important to the current segment and aggregate the representations of those segments to form a refined representation:

$$\hat{\mathcal{H}}^{t,k} = \sum_{i \in (t-h,t)} \alpha^i \mathcal{H}^{i,k}$$

-continued where $$\alpha^i = \frac{\exp\left\{\frac{(\mathcal{H}^{t,k})^T \mathcal{H}^{i,k}}{X}\right\}}{\Sigma_{i\in(t-h,t)}\exp\left\{\frac{(\mathcal{H}^{t,k})^T \mathcal{H}^{i,k}}{X}\right\}}$$

and where $\chi$ is a rescale factor. The last hidden state $\mathcal{H}^{t,k}$ is taken as the group level context vector. The importance weights $\alpha^{it}$ from previous steps are measured through a Softmax function. This attention formulation is based on the learned hidden states, without using extra parameters.

Block 208 decodes the signature matrices. To decode the spatio-temporal feature maps and get the reconstructed system signature matrices, the present embodiments can use hierarchical deconvolutional neural networks (DeCNNs) formulated as:

$$\hat{X}^{t,k-1} = P\begin{cases} f(\hat{\mathcal{H}}^{t,k} \circledast W^{t,k} + \hat{b}^{t,k}), & k=4 \\ f([\hat{\mathcal{H}}^{t,k} \oplus \hat{X}^{t,k}] \circledast \hat{W}^{t,k} + \hat{b}^{t,k}), & k=3,2,1 \end{cases}$$

where $\circledast$ denotes the deconvolutional operation, $\oplus$ is the concatenation operation, $f(\cdot)$ is the activation unit (e.g., same as in the convolutional encoder), and $\hat{W}^{t,k}$ and $\hat{b}^{t,k}$ are filter parameters of the $k^{th}$ deconvolutional layer.

The present embodiments follow the reverse order as compared to the convolutional step and feed $\hat{\mathcal{H}}^{t,k}$ of the $k^{th}$ convolutional LSTM layer to a DeCNN. The output $\hat{\chi}^{t,k-1}$ is concatenated with the output of the previous convolutional LSTM layer, making the deconvolutional process hierarchical. The concatenated representation is further fed into the next deconvolutional layer. The final output $\hat{\chi}^{t,0}$ represents the reconstructed signature matrices.

As a result, four deconvolutional layers can be used, with filters sized 2×2×256×128, 2×2×256×64, 3×3×128×32, and 3×3×64×3 and strides sized 2×2, 2×2, 2×2, and 1, respectively. The decoder incorporates representation information at different CNN and convolutional LSTM layers into the decoding process. The hierarchical mechanism is effective for improving anomaly detection performance.

Block 210 uses the reconstructed signature matrices and the original signature matrices to determine residual matrices. These residual matrices are used in a loss function and block 210 optimizes the loss function to minimize the different between the respective matrices. The loss function can be expressed as:

$$\mathcal{L} = \sum_t \left\| \chi^{t,0} - \hat{\chi}^{t,0} \right\|^2$$

In some embodiments, an Adam optimizer can be used to minimize the loss. This optimization sets convolutional and deconvolutional kernels as well as attention weights in the neural networks. After sufficient training epochs, the learned neural network parameters are used to infer reconstructed signature matrices of validation and test period data.

Once the loss function has been optimized, block 212 performs anomaly detection using new time series data. An anomaly score is determined as a number of poor reconstructed pairwise correlations—the number of elements having a value that is larger than a given threshold $\theta$ in the residual matrices, where $\theta$ can be empirically set. Residual maps are generated based on the absolute difference between the input and the output of the network. Loss is a value based on the summation over all the entries of the residual matrices. Any sufficiently large anomaly score is used to indicate that an anomaly has occurred.

For example, a cutting threshold $\tau = \beta \cdot \max\{s_{valid}(t)\}$ can be determined, where $s_{valid}(t)$ is the anomaly score measured over a validation period and $\beta \in [1,2]$ is set to obtain the best score according to some metric. The cutting threshold $\tau$ is used to determine whether each entry in the residual map is counted as an anomaly entry. The anomaly score is based on the count for all the residual entries that are larger than the threshold.

Block 214 identifies the time series that are the root cause of the identified anomaly. The different inputs are ranked according to an anomaly score for each, and the top-k time series with the highest anomaly scores are identified as root causes. As noted above, the input and output signature matrices are determined at different scales. To interpret anomaly severity, block 214 computes different anomaly scores based on the residual signature matrices of the different scales—for example, small, medium, and large, with segment sizes w=10, 30, 60. The different scales detect anomalies that occur over different time scales, with smaller-scale matrices detecting anomalies above a relatively small threshold duration and with larger-scale matrices detecting anomalies over a larger threshold duration. The anomaly severity can then be interpreted by jointly considering the different channel anomaly scores at different scales, where an anomaly is more likely to have a long duration if it can be detected by all channels, but is otherwise short- or medium-duration if it is detected by fewer than all channels.

Block 216 performs a corrective action based on the identified time series from block 214. Each anomalous time series is associated with a particular sensor 104 and, thus, identifies a corresponding system or environmental variable that is causing the anomaly. Block 216 takes action to automatically change settings or parameters, directly or indirectly, to correct the anomaly. Thus, for example, if the time series is generated by a temperature sensor, block 216 can increase or decrease cooling to change the measured temperature. If the time series is generated by a directly controllable system, block 216 can change parameters of the system to alter the system's behavior. One example would be, for example, to change a speed of a fuel supply in a power plant.

This process can be repeated, with new data that is collected after the corrective action being evaluated to determine whether the anomalous time series have improved. If the time series have improved, but still register as being anomalous, block 216 can further adjust the systems in question. If no improvement is registered, then a different system can be adjusted or the anomaly can be escalated to a human operator.

Figure 3:
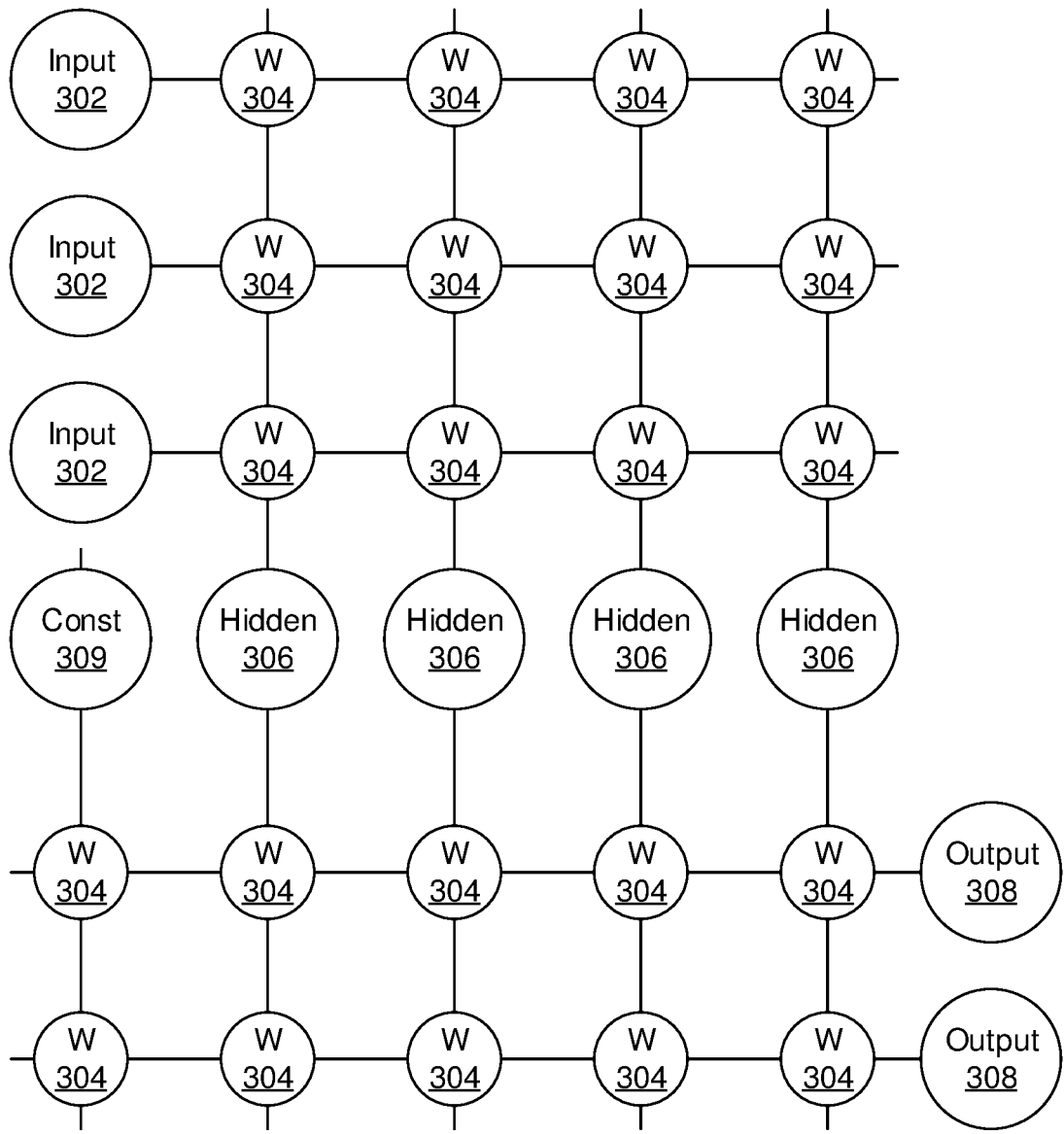
FIG. 3 is a block diagram of a neural network architecture in accordance with an embodiment of the present invention.

Referring now to FIG. 3, an artificial neural network (ANN) architecture 300 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, deconvolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 302 each provide an input signal in parallel to a respective row of weights 304. The weights 304 each have a respective settable value, such that a weight output passes from the weight 304 to a respective hidden neuron 306 to represent the weighted input to the hidden neuron 306. In software embodiments, the weights 304 may simply be represented as coefficient values that are multiplied against the relevant signals. The signals from each weight adds column-wise and flows to a hidden neuron 306.

The hidden neurons 306 use the signals from the array of weights 304 to perform some calculation. The hidden neurons 306 then output a signal of their own to another array of weights 304. This array performs in the same way, with a column of weights 304 receiving a signal from their respective hidden neuron 306 to produce a weighted signal output that adds row-wise and is provided to the output neuron 308.

It should be understood that any number of these stages may be implemented, by interposing additional layers of arrays and hidden neurons 306. It should also be noted that some neurons may be constant neurons 309, which provide a constant output to the array. The constant neurons 309 can be present among the input neurons 302 and/or hidden neurons 306 and are only used during feed-forward operation.

During back propagation, the output neurons 308 provide a signal back across the array of weights 304. The output layer compares the generated network response to training data and computes an error. The error signal can be made proportional to the error value. In this example, a row of weights 304 receives a signal from a respective output neuron 308 in parallel and produces an output which adds column-wise to provide an input to hidden neurons 306. The hidden neurons 306 combine the weighted feedback signal with a derivative of its feed-forward calculation and stores an error value before outputting a feedback signal to its respective column of weights 304. This back propagation travels through the entire network 300 until all hidden neurons 306 and the input neurons 302 have stored an error value.

During weight updates, the stored error values are used to update the settable values of the weights 304. In this manner the weights 304 can be trained to adapt the neural network 300 to errors in its processing. It should be noted that the three modes of operation, feed forward, back propagation, and weight update, do not overlap with one another.

Figure 4:
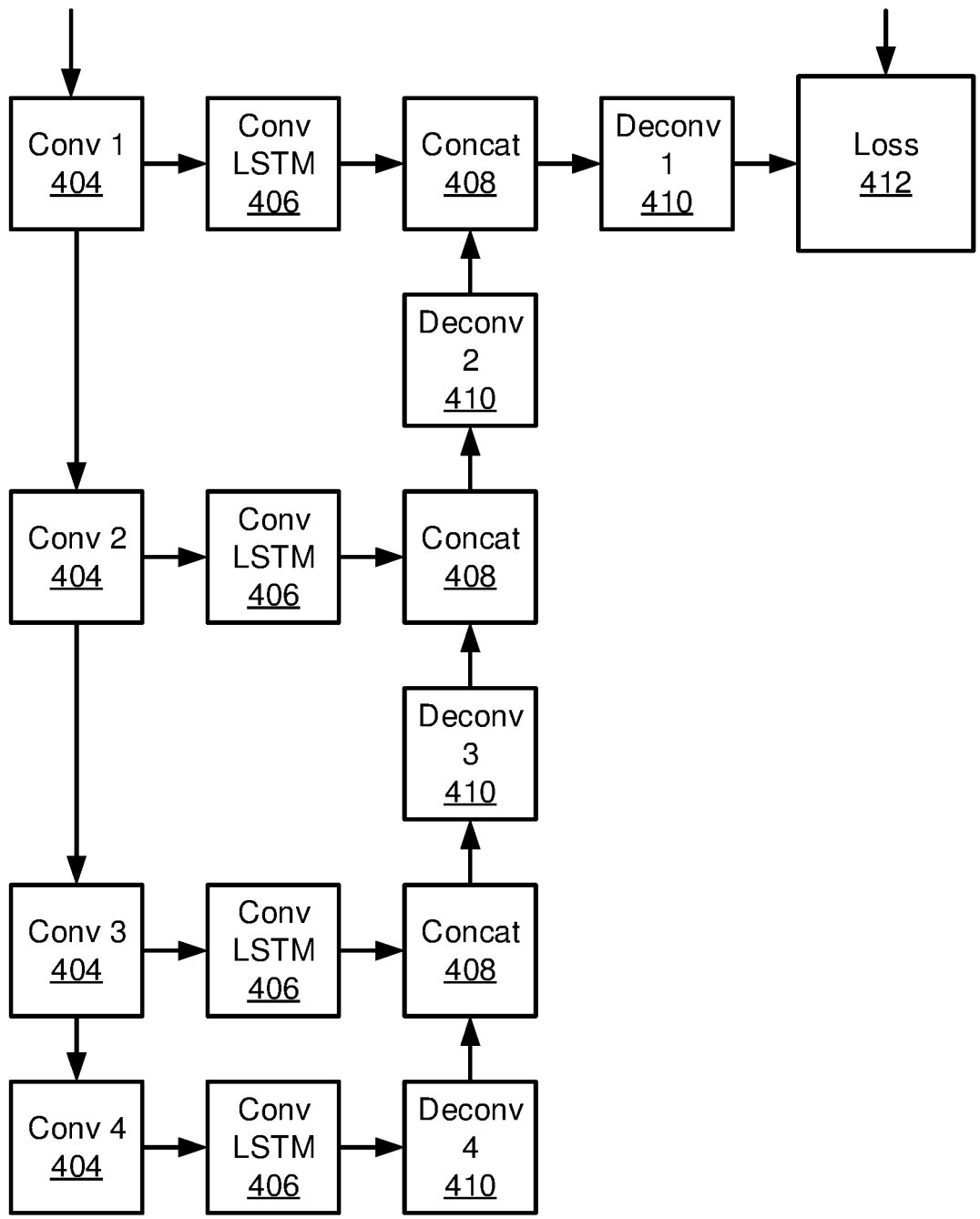
FIG. 4 is a block diagram of a neural network architecture configured for anomaly detection and correction in accordance with an embodiment of the present invention.

Referring now to FIG. 4, the general structure of the neural network 400 is shown. An input is provided that includes the system signature matrices, with each system signature matrix representing a different timescale. This input is applied to a first CNN stage 404. The output of the first CNN stage 404 is applied as an input to a next CNN stage 404, and this continues sequentially through all the CNN stages 404.

Each CNN 404 is formed from a set of distinct steps, as described above. For example, the first CNN 404 may have thirty-two steps with a size of 30×30. Each step of each CNN 404 is used as an input to a respective convolutional LSTM networks in the LSTM blocks 406. The different convolutional LSTM networks in the respective LSTM block 406 provide respective LSTM outputs.

In some embodiments, the LSTM outputs generated from the outputs of the last CNN 404 (e.g., Conv 4) are provided directly to a respective deconvolutional neural network 410. The output of the deconvolutional block 410 is concatenated with the output of the second-to-last CNN 404 (e.g., Conv 3) at a concatenation block 408. The concatenated output is then provided to a deconvolutional neural network block 410. The outputs of the remaining CNNs 404 are added in this way by successive concatenation blocks 408 and deconvolutional blocks 410. A final output is provided to the loss function 412, which compares the final output to the original input matrices.

Figure 5:
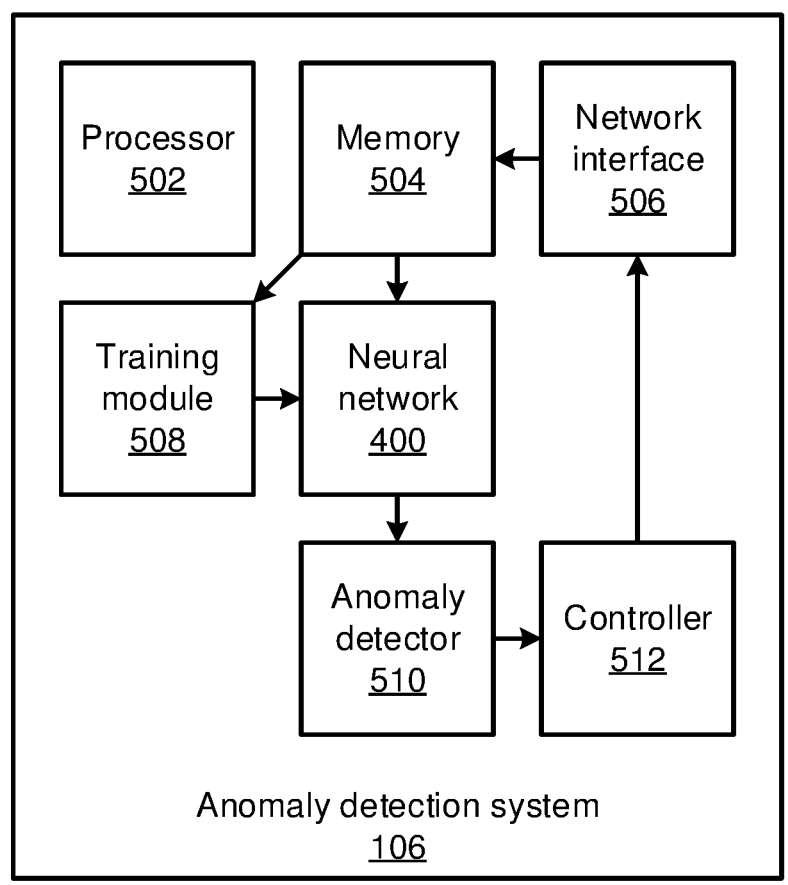
FIG. 5 is a block diagram of a system for anomaly detection and correction in accordance with an embodiment of the present invention.

Referring now to FIG. 5, additional detail on the anomaly detection system 106 is shown. The anomaly detection system 106 includes a hardware processor 502, a memory 504, and a network interface 506. The network interface 506 communicates with the sensors 104 and the system control 108 by any appropriate wired or wireless communications medium and using any appropriate protocol. The anomaly detection system 106 further includes one or more functional modules that may, in some embodiments, be implemented as software that is stored in memory 504 and executed by hardware processor 502. In other embodiments, one or more of the functional modules may be implemented as one or more discrete hardware components in the form of, e.g., application-specific integrated chips or field programmable gate arrays.

A neural network 400 is implemented as described above. In some exemplary embodiments, the neural network 400 may be implemented as software that is executed by the hardware processor 502. A training module 510 trains the neural network 400 using a set of training data, for example including a set of sensor measurements taken when the monitored system 102 is known to be operating correctly. Training can employ, for example, mini-batch stochastic gradient descent with an Adam optimizer. In each epoch, a fixed batch size of multivariate time series segments is randomly selected to generate the system signature matrices as input.

An anomaly detector 512 generates predictions of the behavior of the monitored system 102 using the trained neural network 400. The anomaly detector 512 then compares actual sensor information from the sensors 104 and compares the actual sensor information to the predicted behavior of the monitored system 102. The anomaly detector 512 flags any deviations between the actual sensor information and the predicted behavior that are greater than a threshold value as an anomaly. A controller 514 automatically responds to flagged anomalies by sending instructions to the system control 108 using the network interface 506.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method anomaly detection and correction, comprising:
generating original signature matrices that represent a state of a system of multiple time series, wherein each original signal matrix represents correlation values between two respective time series and is formed from values:

$$m_{ij}^t = \frac{\sum_{\delta=0}^{W} x_i^{t-\delta} x_j^{t-\delta}}{\kappa}$$

where t is a time, where w is a duration of a time period, $\delta$ is an index from time step t−w to t, $x_i^{t-\delta}$ is a value of a first time series at a particular time t−$\delta$, $x_j^{t-\delta}$ is a value of a second time series at the time t−$\delta$, and $\kappa$ is a rescale factor;
encoding the original signature matrices using a plurality of convolutional neural networks;
modeling temporal patterns in the encoded signature matrices using a plurality of convolutional long-short term memory (LSTM) neural networks for each respective convolutional neural network;
decoding the modeled signature matrices using a plurality of deconvolutional neural networks;
determining an occurrence of an anomaly using a loss function based on a difference between the decoded signature matrices and the original signature matrices; and
performing a corrective action responsive to the determination of the occurrence of the anomaly.

2. The method of claim 1, wherein each convolutional neural network of the plurality of convolutional neural networks includes a plurality of steps.

3. The method of claim 2, wherein each convolutional LSTM neural network accepts an output of a respective step of one of the convolutional neural networks.

4. The method of claim 1, wherein decoding the signature matrices comprises sequentially deconvolving an output using a deconvolutional neural network and concatenating the deconvolved output with a next output of the LSTM neural networks.

5. The method of claim 1, wherein encoding the original signature matrices comprises feeding an output of each convolutional neural network to an input of a next convolutional neural network until a final convolutional neural network is reached.

6. The method of claim 1, wherein determining the occurrence of the anomaly comprises comparing an output of the loss function to a threshold.

7. The method of claim 1, further comprising determining a severity of the anomaly using signature matrices at a plurality of different time scales.

8. The method of claim 1, wherein the corrective action is selected from the group consisting of changing a security setting for an application or hardware component of the monitored system, changing an operational parameter of an application or hardware component of the monitored system, halting or restarting an application of the monitored system, halting or rebooting a hardware component of the monitored system, changing an environmental condition of the monitored system, and changing status of a network interface of the monitored system.

9. An anomaly detection and correction system, comprising:
a neural network configured to encoding original signature matrices, which represent a state of a system of multiple time series, using a plurality of convolutional neural network stages, to model temporal patterns in the encoded signature matrices using a plurality of convolutional long-short term memory (LSTM) neural network stages for each respective convolutional neural network, and to decode the modeled signature matrices using a plurality of deconvolutional neural network stages, wherein each original signal matrix represents matrix represents correlation values between two respective time series and is formed from values:

$$m_{ij}^t = \frac{\sum_{\delta=0}^{w} x_i^{t-\delta} x_j^{t-\delta}}{\kappa}$$

where t is a time, where w is a duration of a time period, $\delta$ is an index from time step t−w to t, $x_i^{t-\delta}$ is a value of a first time series at a particular time t−$\delta$, $x_j^{t-\delta}$ is a value of a second time series at the time t−$\delta$, and $\kappa$ is a rescale factor;

an anomaly detector configured to determine an occurrence of an anomaly using a loss function based on a difference between the decoded signature matrices and the original signature matrices; and a controller configured to perform a corrective action responsive to the determination of the occurrence of the anomaly.

10. The system of claim 9, wherein each convolutional neural network stage of the plurality of convolutional neural network stages includes a plurality of steps.

11. The system of claim 10, wherein each convolutional LSTM neural network stage accepts an output of a respective step of one of the convolutional neural network stages.

12. The system of claim 9, wherein the neural network is configured to deconvolve an output of an LSTM neural network stage using a deconvolutional neural network stage and to concatenate the deconvolved output with a next output of the LSTM neural network stages.

13. The system of claim 9, wherein the neural network is further configured to feed an output of each convolutional neural network stage to an input of a next convolutional neural network stage until a final convolutional neural network stage is reached.

14. The system of claim 9, wherein the anomaly detector is further configured to compare an output of the loss function to a threshold.

15. The system of claim 9, wherein the anomaly detector is further configured to determine a severity of the anomaly using signature matrices at a plurality of different time scales.

16. The system of claim 9, wherein the controller is further configured to perform a corrective action selected from the group consisting of changing a security setting for an application or hardware component of the monitored system, changing an operational parameter of an application or hardware component of the monitored system, halting or restarting an application of the monitored system, halting or rebooting a hardware component of the monitored system, changing an environmental condition of the monitored system, and changing status of a network interface of the monitored system.

\* \* \* \* \*